United States Patent [19]

Greenlee et al.

[11] Patent Number: 5,274,043
[45] Date of Patent: Dec. 28, 1993

[54] CHLORINATED PVC BLENDS

[75] Inventors: William S. Greenlee, Avon Lake; Philip L. Kinson, Brecksville; Murali Rajagopalan, Avon Lake, all of Ohio

[73] Assignee: The B. F. Goodrich Company, Akron, Ohio

[21] Appl. No.: 697,817

[22] Filed: May 9, 1991

[51] Int. Cl.$^5$ ............................................. C08L 27/06
[52] U.S. Cl. ................................. 525/239; 525/235; 525/238; 525/240; 525/242; 525/243
[58] Field of Search .............. 525/239, 235, 238, 240, 525/242, 243

[56] References Cited

U.S. PATENT DOCUMENTS

| | | | |
|---|---|---|---|
| 4,304,884 | 12/1981 | Okamoto | 525/239 |
| 4,745,156 | 5/1988 | Yoshihara et al. | 525/80 |
| 5,086,122 | 2/1992 | Lawson et al. | 525/235 |

*Primary Examiner*—John Kight, III
*Assistant Examiner*—Duc Truong
*Attorney, Agent, or Firm*—Joe A. Powell; Miles B. Dearth; Helen A. Odar

[57] ABSTRACT

Blend compositions and process are provided comprising admixing of chlorinated polyvinyl chloride and polyvinyl chloride, each having specified inherent viscosity wherein the difference in the inherent viscosity of the polyvinyl chloride of the blend, measured in similar accordance with ASTM-D1243 is at least 0.2 units higher than the precursor polyvinyl chloride for the chlorinated polyvinyl chloride of the blend. Preferably the I.V. of the polyvinyl halide is from 0.2 to 1.0 units higher with the most preferred difference in I.V. (ΔI.V.) being 0.35 to 0.65 units so as to yield a balance of property improvements including tensile strength, impact resistance, heat distortion temperature and weatherability. The compositions also can further comprise a Tg enhancing agents which otherwise embrittle conventional PVC compounds. The blends of the present invention are processible by a variety of techniques including injection molding, extrusion, calendering, thermoforming, compression molding and the like to form useful articles such as molded sheets, trays, shrouds as for fans, appliance parts and covers, electrical outlets, business machine housings, piping telecommunication equipment, automotive components, and numerous others.

37 Claims, No Drawings

CHLORINATED PVC BLENDS

FIELD OF THE INVENTION

This invention relates to modified chlorinated polyvinyl chloride (CPVC) resins, compounds and articles derived therefrom. In particular blends of CPVC are disclosed having improved properties enabling processing for example by injection molding of rigid articles having an improved combination of properties.

BACKGROUND

Recently CPVC has experienced steady growth in demand as various technologies have emerged relative to physical compound modifications. Improvements have been shown particularly for flow modification applicable to injection molding applications. A variety of melt flow and impact modifiers have been employed in modifying CPVC which have spurred the advancement in molding and performance properties.

Recent disclosures illustrate approaches pertaining to modified CPVC. U.S. Pat. No. 4,847,331 discloses a CPVC compound comprising a blend of CPVC having a chlorine content of between about 60% and 66% by weight and a polymethylmethacrylate comprising not more than 80% by weight of the blend. The composition of matter displays homogeneous, substantially single phase behavior with the CPVC and polymethylmethacrylate being substantially or completely miscible. The resulting blended material exhibits enhanced temperature and durability properties and remains homogeneous up to a temperature of 230° C.

U.S. Pat. No. 4,647,626 discloses a blend of CPVC having chlorine content between 60% and 67% by weight and a styrene-acrylonitrile (SAN) copolymer having acrylonitrile content between 15% and 25%. Partial solubility is presumed from a single glass transition endotherm.

U.S. Pat. No. 4,710,533 discloses a CPVC blend including the aforementioned SAN copolymer and a flow enhancing polymer such as alpha-methyl styrene. Impact modifiers such as ABS are also suggested.

U.S. Pat. No. 4,501,849 discloses a rigid CPVC blend with a high melt flow polypropylene which serves to retard the fusion rate of the CPVC compound during processing.

It was heretofore unknown that certain blends of CPVC and PVC would exhibit a significantly improved combination of properties and that particular blends would exhibit along with the property improvements, sufficient melt flow as to be useful particularly for injection molding of articles. Such a blend would be desirable if the need for employing the aforementioned melt flow and impact modifiers could be reduced or eliminated thereby providing improvements for example in compound simplicity, flame resistance, ease of processing and raw material cost economics.

SUMMARY OF THE INVENTION

It is therefore an aspect of the present invention to provide blends of CPVC and PVC resins according to a relationship between said resins relative to differences in their logarithmic viscosity number (inherent viscosity) between the two said resins so as to yield a desired combination of property improvements.

It is another aspect of the present invention to provide a CPVC blend with PVC which exhibits high melt flow achieved by selecting the two said resins based on this $\Delta$ I.V. relationship In another aspect of the present invention said blends are made according to the $\Delta$ I.V. relationship with reduced amounts of conventional impact modifier thereby enabling improved weatherability and chemical resistance.

In a further aspect of the present invention said blends are made according to the $\Delta$ I.V. relationship and exhibit high annealed heat distortion temperatures in addition to exhibiting adequate melt flow desired especially for injection molding processes.

These aspects are enabled by the blends disclosed herein and comprising a chlorinated polyvinyl chloride polymer derived from a precursor polyvinyl chloride having an inherent viscosity measured similarly per ASTM-D1243 (I.V.) of between 0.2 and 2.0, preferably 0.2 to 1.0, more preferably between 0.3 and 0.8, and most preferably between 0.4 and 0.7, in combination with a polyvinyl chloride polymer having an inherent viscosity between 0.4 and 2.5, wherein said inherent viscosity for said polyvinyl chloride is at least 0.2 units higher than said inherent viscosity for said precursor polyvinyl chloride for said chlorinated polyvinyl chloride. Preferably the $\Delta$ I.V. ranges between 0.2 and 1.0 units, more preferably $\Delta$ I.V. ranges from 0.3 and 1.0 units with the most preferred $\Delta$ I.V. between 0.35 and 0.65 units, provided that the $\Delta$ I.V. can lie between about 1.0 and 2.0 units when the amount of PVC does not exceed about 15 weight parts per 100 weight parts CPVC and PVC combined. When the $\Delta$ I.V. is 1.0 or less, the amount of polyvinyl chloride can range from 1 to 70 weight parts per 100 weight parts chlorinated polyvinyl chloride and polyvinyl chloride combined, preferably from 1 to 50 weight parts, more preferably from 3 to 30 weight parts and most preferably from 5 to 15 weight parts PVC. The blend can further comprise an impact modifier in an amount generally from 1 to 50 weight parts, preferably from 3 to 30 parts, and more preferably from 5 to 12 weight parts per 100 weight parts chlorinated polyvinyl chloride and polyvinyl chloride combined. The present invention can also contain a Tg enhancing additive. When such an additive is present, the blend composition of the present invention significantly offsets the embrittling effect of these additives.

DETAILED DESCRIPTION

Post-chlorinated PVC (CPVC) is defined for this invention as generally containing from higher than about 57% to less than about 78% by weight (wt. %) of bound chlorine. Commercially available CPVC generally contains greater than about 57 wt. % chlorine, and is most prevalent in the range from about 60% to 67% by weight of chlorine. CPVC used in the invention desiredly contains from about 60% to about 70% by weight and preferredly from about 63% to about 69% chlorine by weight. There are practical limitations in the use of chlorinated PVC having higher than about 70% chlorine content.

As a direct indication of molecular weight, the inherent viscosity of the precursor PVC which is post-chlorinated can range from about 0.2 to about 2.0 I.V. or higher. A preferred I.V. is in the range of from about 0.3 to about 1.0 with the most preferred I.V. in the range of from about 0.35 to 0.7. A practical limit is reached with CPVC derived from a high I.V. precursor PVC wherein difficulty is encountered with fusion, flow and degradation at melt processing temperatures. A CPVC derived from a precursor PVC having an I.V. higher than about 2.0 is not desired for use with the present blends. It is understood that throughout this specification, I.V. specified for a CPVC means the I.V. of the precursor PVC for said CPVC.

Techniques for post-chlorination of PVC are illustrated, for example, in U.S. Pat. No. 4,377,459 which discloses a liquid chlorine method. The use of CPVC prepared in any suitable or conventional manner is contemplated as within the purview of this invention.

Polyvinyl chloride polymers referred to in this specification include polyvinyl chloride homopolymers, vinyl chloride copolymers, graft copolymers, vinyl halide polymers polymerized in the presence of any other polymer such as a high heat distortion temperature enhancing polymer, impact toughener, barrier polymer, chain transfer agent, stabilizer, plasticizer or flow modifier. For example a combination of modifications may be made with the PVC polymer by overpolymerizing a low viscosity, high glass transition temperature (Tg) enhancing agent in the presence of a chain transfer agent. Such a method is disclosed in U.S. Pat. No. 4,814,387 incorporated herein by reference. In an alternative embodiment, the vinyl chloride may be polymerized in the presence of said Tg enhancing agent, the agent having been formed prior to, or during the vinyl chloride polymerization.

Where the selected PVC is a vinyl chloride copolymer, any monomer copolymerizable with vinyl chloride and known in the art may be employed, thus, the practice of the present invention does not preclude selection of one or more than one comonomer. Such co-polymerizable monomers for PVC include acrylate esters, methacrylate esters, monoolefins, diolefins, styrene derivatives, acrylonitrile, vinyl esters, vinylidene chloride, vinyl ethers, and crosslinking comonomers such as allyl methacrylate, and diallyl phthalate. Preferred comonomers include ethylene, propylene, 1-butene, 2-butene, 1-pentene, 1-hexane, isobutylene and vinylidene chloride. The most preferred comonomers are ethylene, propylene, 1-butene and isobutylene in minor proportions so as to not appreciably depress the HDT for the blend. The amount of comonomer that may be polymerized with vinyl chloride is a function of the choice of comonomer, as is well understood by those skilled in the art. Any polyvinyl chloride polymer of this invention whether post-chlorinated or not is most preferably a polyvinyl chloride homopolymer or copolymer with a minor amount of the most preferred comonomer(s).

The preparation of PVC resin is well established and therefore a detailed discussion is beyond the scope of this invention. The I.V. for PVC blended with CPVC can range from 0.4 to 2.5 or higher; preferably from 0.6 to 1.9, more preferably from 0.8 to 1.6 and most preferably from 0.9 to 1.05. A conventional PVC resin can be prepared by any known polymerization process such as, but not limited to suspension, mass, solution, emulsion, dispersion and microsuspension techniques. A preferred process for preparing conventional polyvinyl chloride resin for use in this invention is the aqueous suspension process and is disclosed in U.S. Pat. Nos. 4,659,791 ('791) 4,775,699, 4,797,458 and 4,871,780 incorporated herein by reference. The suspension process in '791 involves an agitated reaction medium during the entire reaction period. Water is the polymerization medium and a vinyl monomer to water ratio is selected in the range of about 1:1 to 1:10. Preferably a vinyl monomer-water ratio in the range of about 1:1 to 1:4 is employed. The preferred suspension process to prepare the precursor PVC for said chlorinated polyvinyl chloride includes the use of hydroxypropyl methylcellulose dispersants. Preferably a skinless PVC suspension resin may be used in the blends of the present invention. A method for preparing skinless PVC resins is disclosed in U.S. Pat. No. 4,711,908, incorporated herein by reference.

The particular inherent viscosities for the PVC used to make CPVC and PVC resins blended therewith are generally controlled during the polymerization of each said resin by polymerization temperature and/or by the use of chain transfer agents, both techniques being well known in the art.

Of particular importance to the present invention is the I.V. of the PVC relative to the I.V. of the PVC precursor for the CPVC as measured in a manner similar to ASTM-D1243. Each is selected within a particular $\Delta$ I.V. range in order to exhibit enhanced properties shown below by way of the examples.

Inherent viscosity is defined as the ratio of the natural logarithm of the relative viscosity of a resin and the concentration in grams of the solution used to measure the viscosity. A method similar to ASTM-D 1243-58T Method A is employed to determine inherent viscosity of an 0.2 g sample in 100 ml of cyclohexanone at 30° C. These values have been related to the polymerization degree (JIS K 6721) and weight average molecular weight of a polymer and are reported in *Plastics*, 28, 98 p. (1963).

As introduced above, there is a limitation in maximum chlorine content, and I.V. relative to acceptable melt flow of halogenated polymers. Recently disclosed CPVC flow enhancers such as $\alpha$-methyl styrene polymers or high melt flow polypropylene generally lack sufficient miscibility with CPVC and yield brittle blends, thus requiring additional compatibilizing agent or impact modifiers or both.

The approach of the present invention involves modifying CPVC preferably not with an incompatible flow enhancer which may require further impact modifier and compatibilizer, but with a minor amount of a higher I.V. PVC. This approach provides a desired combination of properties with a reduced level of conventional impact modifier. In particular, a relatively high melt flow CPVC was blended with a PVC having higher I.V. than the PVC precursor for CPVC. This resulted in a reduction in the melt flow rate but not so severe as to limit practical processing of the blend. The reduction in melt flow rate was accompanied by unexpected improvements in tensile strength, elongation and impact toughness and was achieved without a significant loss in heat deflection performance. The preferred blends contain PVC having an I.V. at least about 0.2 units higher than the I.V. of the precursor PVC for CPVC and preferably a $\Delta$ I.V. of 0.2 to 1.0 I.V., a more preferred $\Delta$ I.V. of from 0.3 to 1.0, with the most preferred I.V. being 0.35 to 0.65, the PVC blended therewith always having the higher I.V. With this relationship acknowledged, a wide range of I.V. can be selected for the CPVC precursor resin component and the I.V. of the PVC blended therewith can be advantageously chosen thereby yielding the desired balance of properties. For example, a preferred CPVC polymer derived from a precursor PVC having an I.V. of from about 0.3 to about 0.8 can be selected in blends with a PVC polymer having the higher I.V. than the CPVC. The I.V. of the PVC which is optimum for a particular CPVC will be preferably from about 0.2 to about 1.0 I.V. units higher than the I.V. of the chosen PVC precursor for CPVC.

Within the preferred CPVC and PVC ΔI.V. ranges, further variation of composition is contemplated by varying the weight ratio of CPVC and PVC. Generally when a high heat distortion temperature is desired and the blend consists of a CPVC having the precursor PVC I.V. chosen according to the relationship given, the PVC blended therewith is preferredly present in amounts from 1 to about 100 weight parts, preferably between 1 and 70 weight parts, more preferably between 3 weight parts and 30 weight parts and most preferably from 5 to 15 weight parts per 100 weight parts of combined CPVC and PVC in the blend.

The ΔI.V. relationship observed for CPVC/PVC blends is unique in that the high degree of compatibility between each of these resins enables a toughened blend. The amount employed of PVC component is efficient in achieving desired improvements and at the same time heat distortion temperature is not appreciably sacrificed. Melt flow is not severely sacrificed and remains adequate for those blends which display an optimum balance of improved strength, impact resistance, HDT, weatherability and chemical resistance. Moreover it is understood that conventional impact modifiers generally act as melt flow suppressants, therefore, with reduced levels of impact modifier required in the blends of the present invention, a relative gain in melt flow is achieved.

Optional flow enhancing additives are the aforementioned α-methyl styrene polymers, polypropylene, imidized PMMA, and low acrylonitrile containing SAN copolymers in addition to modifications which can be made to the PVC precursor polymer itself outlined above.

The CPVC/PVC blend can contain effective amounts each preferably ranging from 0.5 to about 15 parts by weight of various lubricants and stabilizers known to the art as well as to the literature. For example, various external lubricants such as stearic acid, oxidized polyethylene, polypropylene, paraffin wax, and metallic salts of fatty esters including mixtures and the like can be utilized. Stabilizers for PVC and CPVC include barium/cadmium/zinc compounds, and various organo-tins, for example methyl, -butyl, -octyltin carboxylates, mercapto-carboxylates, mercaptides, glycolates, thioglycolates and the like. Specific examples include dibutyltin-S-S'-bis-(isooctylmercaptoacetate), dibutyltin dilaurate, with organo tin diisooctyl thioglycolates being preferred. Secondary stabilizers may be included for example phosphites, and metal salts of phosphoric acid. Specific examples of salts include water-soluble, alkali metal phosphate salts, disodium hydrogen phosphate, orthophosphates such as mono-di and tri-orthophosphates of said alkali metals, alkali metal polyphosphates, -tetrapolyphosphates and -metaphosphates and the like. Typical levels of secondary stabilizers range from about 0.1 wt. parts to about 7.0 wt. parts per 100 wt. parts halogenated polymers. In addition, antioxidants may also be incorporated such as phenolics, BHT, BHA, various hindered phenols, and various inhibitors such as substituted benzophenones can be utilized to provide oxidation resistance, U.V. resistance, etc.

Inasmuch as high impact values are often desired, additional impact modifiers may be incorporated, as noted above, and are known to the art as well as to the literature. For example, various impact modifiers can be utilized as set forth in *The Encyclopedia of PVC*, Volume 2, Chapter 12, Marcel Dekker, Inc., New York, 1977, which is incorporated herein by reference. Examples of commercially available impact modifiers include acrylonitrile-butadiene-styrene (ABS) polymers, chlorinated polyethylenes, graft copolymers of acrylic rubbers, the various poly(ethylene-co-vinyl acetates), styrene-butadiene-styrene block copolymers, graft copolymers of methylmethylacrylate, butadiene, styrene (MBS), including mixtures thereof. Preferred impact modifiers include ABS, MBS, and chlorinated polyethylene. Regardless of the exact type of impact modifier utilized, the amounts thereof can vary depending upon the desired impact strength as typically measured by an Izod impact test, (ASTM D256). The levels of impact modifier can vary from about 1 to about 50 parts by weight, and more preferably from about 5 to about 20 parts by weight based upon 100 parts by weight of said combined CPVC/PVC blend. Most preferably impact modifier is present at from 5 to 12 weight parts per 100 weight parts of PVC/CPVC. Accordingly, the blends of the present invention have the capacity to be impact-modified to achieve notched Izod values generally in excess of 100N·m/m (of notch), desirably in excess of 200N·m/m and preferredly in excess of 230N·m/m.

Various fillers, pigments and colorants can also be utilized in effective amounts. Fillers can be employed at levels of about 0 to about 300 parts by weight for every 100 parts by weight of the resin blend. Examples of fillers include calcium carbonate, clay, silica, various silicates, and talc. Examples of various pigments include titanium dioxide, carbon black and the like. In Examples 7–9, 4.5 wt. parts of pigment were used. In Examples 10–22, 2.0 wt. parts were used.

Plasticizers may be included in any manner and amount. Exemplary plasticizers are set forth in *The Technology of Plasticizers*, by Sears and Darby, pages 893–1085, John Wiley and Sons, New York, 1982, which is incorporated herein by reference. Plasticizers are preferably present at levels less than 100 parts by weight of resin, more preferably less than 5 parts by weight and most preferably absent.

The compositions of the present invention can further comprise a Tg enhancing additive blended therewith. Any suitable such additive may be incorporated into the CPVC/PVC blend wherein the Tg of the blend is increased. There may be one higher Tg or two Tg's exhibited by the combination depending on the miscibility of the components. The Tg enhancing additive can be incorporated in an amount ranging from 1 to about 400 weight parts per 100 weight parts of the combined weight of CPVC and PVC, and preferably the Tg enhancing additive is present at from 20 to about 300 weight parts per 100 weight parts of the combined weight of CPVC and PVC. Examples of Tg enhancing additives are α- methyl styrene derivatives and imide derivatives, including copolymers, terpolymers and tetrapolymers. Block or graft versions are also contemplated. Specific examples include styrene- α-methylstyrene-acrylonitrile terpolymers, imidized polymethylmethacrylate, imide polymethylmethacrylate copolymer, a tetrapolymer of styrene, α-methylstyrene, acrylonitrile and N-cyclohexyl maleiimide, and a tetrapolymer of styrene, α-methylstyrene, acrylonitrile and N-phenyl maleiimide.

The CPVC/PVC blend can be prepared along with the various additives for instance in a high speed powder mixing device, a Banbury mixer or the like, and then fused on a two-roll mill and cubed. The compound in a fused, cubed state can be subsequently calendared, extruded, or injection molded or processed by any suitable melt processing means. The vinyl chloride polymers can also be mixed with the various additives in a high intensity mixer such as a Henschel mixer and then processed on an extruder into pellets or directly into a finished article as for instance using a twin screw extruder. In general, any conventional means of compounding such as a Banbury mixer, two-roll mill, Henschel mixer, ribbon blender, compounding extruder, injection molding machine and the like can be used to prepare the compounds of this invention.

The blended compounds of the present invention can be processed by a variety of techniques including injection molding, extrusion, calendaring, thermoforming, compression molding and the like to form end-use articles such as molded sheets, trays, shrouds as for fans, appliance parts and covers, electrical outlets, business machine housings, piping, telecommunication equipment, automotive components, and numerous others.

The invention will be better understood by reference to the following examples.

EXAMPLES 1-6

Example CPVC/PVC blend compounds were prepared to demonstrate the various features of the present invention by melt blending of a selected CPVC resin having an I.V. for the precursor PVC of 0.46 in combination with a PVC resin, each containing a different I.V. as listed below. The following compound recipe was employed for Examples 1-6:

|  | Wt. Parts |
| --- | --- |
| CPVC (0.46 I.V., 68% chlorine) | 56 |
| PVC (Var. I.V.)[1] | 35 |
| Impact Modifier | 12 |
| Stabilizer[2] | 1.8 |
| Lubricants | 3 |

[1]Example 1-6 used I.V. of 0.46, 0.53, 0.68, 0.92, 1.0 and 1.6 respectively.
[2]Tin mercaptide stabilizer.

Examples 1-3 were mixed in a 160° C. Banbury mill and dumped at a stock temperature of 176° C. Examples 4-6 were mixed at 154° C. and dumped at 176° C. The blends were placed on a 2-roll mill for several passes, one roll heated to 160° C. and the other at 170° C. The milled sheets were then cubed. Injection molded standard test plaques were formed on a 75 ton Van Dorn molding machine. Testing of the molded specimens was performed by the following methods:

|  | Method | Units |
| --- | --- | --- |
| Tensile Strength | ASTM D638 | Kg cm$^{-2}$ |
| Annealed Heat Distortion Temp.* | ASTM D648 | °C. |
| Izod Impact Resistance** | ASTM D250 | N · m/m |
| Spiral Mold Flow | see below | cm. |

*at 264 psi (1.4 MPa) annealed 24 hrs at 50° C.
**at room temperature

Spiral mold flow is a measure of the extent of injection melt flow under a fixed work impute and predicts limitations in size and configuration of injection molding dies suitable for a given resin compound. The test employs a graduated 60-inch spiral flow mold with a defined cross section used in conjunction with an injection molding machine. Conditions are kept standardized within each series of tests. Generally, the mold temperature is set, the injection melt pressure is constant, injection time, clamp time, and mold open time are constantly giving a total cycle time. A screw of L/D at least 15 is used. For every compound at least three consecutive shots were used for averages of spiral flow length measurement with higher numbers being preferred.

The compositions in the examples were also evaluated for processing stability. A primary measure of the relative thermal stability and processability of vinyl compounds is the "dynamic thermal stability time" (DTS) in minutes. This test is designed to measure the time-torque relationship at selected temperatures using an instrument such as the Brabender Plasti-corder. The test value generally reported and used for comparison is the "DTS time". DTS time is usually defined as the time required for the instrument torque to fall to its minimum value, with the polymer compound in the melted state, before beginning to increase, presumably due to instability and usually accompanied by autogenous crosslinking. DTS time is dependent not only on polymer properties, but also on temperature, sample size, stabilizers, lubricants, instrument operating conditions, degree of instrument maintenance, and other conditions which are controlled for accurate comparison between different compounds.

TABLE I

| Example | ΔI.V. | Tensile Strength MPa | Notch Izod N · m/m | Unnotch Izod N · m/m | Anneal HDT °C. | Spiral Flow cm |
| --- | --- | --- | --- | --- | --- | --- |
| 1 | 0 | 44.80 | 56 | 400.2 | 77.0 | 76.9 |
| 2 | 0.07 | 47.10 | 103 | 1403.6 | 81.6 | 66.0 |
| 3 | 0.22 | 48.6 | 138 | 1878.6 | 82.2 | 55.8 |
| 4 | 0.46 | 51.62 | 246 | 2038.7 | 83.9 | 42.4 |
| 5 | 0.54 | 49.80 | 233 | 1958.6 | 83.9 | 39.6 |
| 6 | 1.14 | 45.21 | 62 | 283.9 | 84.4 | 30.7 |

By way of inspection of the results of Table I with the exception of spiral flow, there is a clear trend of improved properties in examples 2 to 5 with example 6 evidencing a significant drop-off in properties. Examples 4 and 5 exhibit a preferred balance of high tensile strength, impact resistance and HDT. As outlined above, the approach followed an expectation that spiral flow would be reduced but the severity was less than expected as is seen in successive example blends of successively higher I.V. PVC. It was not expected that the other properties would be substantially increased when the I.V. difference between PVC and CPVC (ΔI.V.) rose above about 0.2 and reached a maximum at between about 0.35 to about 0.65 units thereafter falling as ΔI.V. was beyond about 1.0 units. It was also not expected that property maximums would occur while spiral flow was maintained at an adequate level between 55 and 35 cm. Table I illustrates that outside of the preferred ΔIV range as in Examples 1 and 6 wherein ΔIV is o and 1.6− 0.46=1.14 respectively, performance dropped off dramatically. Therefore blends of CPVC and PVC having a ΔI.V. ranging from about 0.2 to about 1.0 are preferred in addition to blends wherein the Δ I.V. is between 1.0 and 1.5 provided that the amount of PVC does not exceed 15 weight parts, preferably not more than 10 weight parts on the basis of combined CPVC and PVC.

Demonstration of improved impact toughening of a CPVC/PVC blend versus CPVC alone in combination with a conventional impact modifier is shown by Examples 7-9. The ingredients were hand mixed and fluxed in a Banbury mill at 380° F. to 390° F. for 1 minute. The fluxed compound was milled on a 2-roll mill for 4 minutes after banding at 355° F.-360° F. The milled sheets were cubed. The cubes were injection molded at a stock temperature of 395° F.-400° F. for measurements of physical properties and spiral flow. The compound formula for Examples 7-9 is given below:

|  | Example/Parts | | |
|---|---|---|---|
|  | 7 | 8 | 9 |
| CPVC (0.46 I.V., 63.5% Chlorine) | 88 | 88 | 88 |
| PVC (0.92 I.V.) | — | — | 10 |
| Titanium dioxide | 4.5 | 4.5 | 4.5 |
| Impact modifier | 10 | 6.0 | 6.0 |
| Tin Stabilizer | 2.0 | 2.0 | 2.0 |
| Lubricants | 3.0 | 3.0 | 3.0 |

TABLE 2

| Example | Tensile Strength MPa | Notched Izod J/m* | Unnotched Izod J | Annealed HDT °C.** | Spiral Flow in. (cm.) |
|---|---|---|---|---|---|
| 7 | 47.4 | 300 | 1996 | 90.5 | 44 (111) |
| 8 | 50.1 | 338 | 1791 | 89 | 46 (117) |
| 9 | 51.9 | 678 | 2154 | 87.5 | 44.4 (113) |

*of notch
**at 264 psi (1.82 MPa) annealed for 24 hrs at 72° C.

Example 9 contained 10 parts of PVC and $\Delta$I.V. was 0.48 and within the preferred $\Delta$I.V. range. A 40% reduction in the level of impact modifier was used in Examples 8 and 9 compared to Example 7. Example 9 exhibited unexpected improvements in tensile strength and a very large increase in impact resistance, yet with little reduction in spiral flow versus example 8 absent PVC. Example 9 thus compares favorably with Examples 7 and 8 and will also exhibit significantly improved weathering performance and chemical resistance with reduced levels of impact modifier. The loss in weathering and chemical resistance due to impact modifiers is known.

It is desirable for injection moldable resin compounds generally to exhibit spiral melt flow rates of at least about 25 cm. As outlined above, if a higher I.V. CPVC is employed and the PVC is selected according to the preferred $\Delta$I.V. range, melt flow of the blend may be increased by the use of a minor amount of one or more melt flow enhancers known in the art, for example a high melt flow polyolefin or polystyrene. A Tg enhancing additive such as an acrylic imide copolymer or styrene derivative polymer can be used. Typical usage levels would be about 0.2 to about 100 parts by weight based on the weight of the blend. Preferred levels of Tg enhancing additive are from 0.2 to 40 weight parts and most preferably from 0.2 to 10 weight parts per 100 weight parts of CPVC/PVC blend. Preferably the need for melt flow enhancers is minimized by selecting the desired I.V. ranges for CPVC and PVC so as to give adequate flow as in Examples 4 and 5. From the above examples it is shown from Example 9 a composition comprising a major amount of a CPVC derived from a precursor PVC within the most preferred range of I.V. in combination with a minor amount of a PVC having an I.V. within the most preferred range, and an impact modifier, wherein Example 9 exhibits a notched Izod impact strength at least as high as a composition absent said blended PVC and containing at least 40% more impact modifier than that used for said first composition.

EXAMPLES 10-22

In Examples 10-22, compositions are shown which contain a CPVC resin derived from a PVC having an I.V. of 0.46 combined with a minor amount of a PVC resin having a higher I.V. The proportion of each resin is listed in Table 1. The compounds contain the following components:

| Component | Weight Parts |
|---|---|
| CPVC | varied |
| PVC | varied |
|  | Total = 100 |
| MBS Impact Modifier | varied |
| Tin Stabilizer | 2 |
| Lubricants | 3 |
| filler | 2 |

The ingredients were hand mixed and then fluxed in a Banbury. The fused compounds were milled on a 2 roll mill. The compound was cubed and injection molded into standard test specimens. An Instron capillary rheometer was used to measure low shear viscosity at 149 reciprocal seconds. Variable height impact testing (VHIT) was conducted similar to ASTM D-3029, using a ⅝ inch (15.8 mm) diameter tup or weight and measured at room temperature on specimens of approximately three inch square (19 cm$^2$ by 75 mils (1.9 mm)). The results were expressed in inch-lbs. (J) total force. Izod impact tests were conducted for notched and unnotched (un) specimens, at room temperature and −40° C. and reported in ft-lbs/in.

TABLE III

| Example | I.V. | 10 | 11 | 12 | 13 | 14 | 15 | C16 | C17 | 18 | 19 | 20 | 21 | 22 |
|---|---|---|---|---|---|---|---|---|---|---|---|---|---|---|
| CPVC* | 0.46 | 100 | 99 | 97 | 95 | 90 | 80 | 100 | 100 | 99 | 97 | 95 | 90 | 80 |
| PVC1* | .92 | 0 | 1 | 3 | 5 | 10 | 20 | — | — | — | — | — | — | — |
| PVC2 | 1.6 | — | — | — | — | — | — | — | — | 1 | 3 | 5 | 10 | 20 |
| I. MOD. |  | 8 | 8 | 8 | 8 | 8 | 8 | 13 | 18 | 8 | 8 | 8 | 8 | 8 |

*weight parts

Tables III and IV illustrate two series of Examples, 10-15 and 18-22 with $\Delta$ I.V. of 0.46 and 1.14 respectively. The PVC amounts within each series were evaluated at 0, 1, 3, 5, 10 and 20 wt. parts based on the sum of wt. parts of CPVC and PVC.

TABLE IV

| Example | 10 | 11 | 12 | 13 | 14 | 15 | C16 | C17 |
|---|---|---|---|---|---|---|---|---|
| RT-IZOD-N | 8.4 | 9.8 | 9.6 | 9.0 | 8.7 | 8.0 | 9.0 | 9.2 |
| RT-IZOD-UN | 31.2 | 39.7 | 39.7 | 39.9 | 39.8 | 39.9 | 39.7 | 39.7 |
| −40° C. IZOD-N | 2.0 | 1.96 | 2.3 | 1.9 | 1.4 | 7.9 | 1.1 | 1.8 |
| −40° C. IZOD-UN | 11.4 | 16.7 | 11.1 | 24.9 | 11.6 | 23.8 | 19.4 | 19.4 |

TABLE IV-continued

| | | | | | | | | |
|---|---|---|---|---|---|---|---|---|
| Annealed HDT (°C.) | 84.5 | 87.5 | 85.5 | — | 83.5 | 81.0 | 86.0 | 92.0 |
| VCAT B | 97.5 | 99 | 96.5 | 99.5 | 101.5 | 99 | 99 | 98.5 |
| Spiral Flow | 25.5 | 21 | 19.7 | 21 | 19.2 | 19.5 | 22.5 | 20.2 |
| L S. Visc (Poise) | 10,925 | 11,757 | 12,433 | 12,745 | 13,682 | 14,150 | 10,300 | 13,526 |
| VHIT in. Lb./(J) | 6/.7 | 8/.9 | 8/.9 | 30/3.38 | 60/6.77 | 98/11.0 | 60/6.77 | 160/18.0 |
| DTS (Min.) | 15 | 15 | 14 | 20 | 19 | 18 | 13 | 11 |

| Example | 18 | 19 | 20 | 21 | 22 |
|---|---|---|---|---|---|
| RT-IZOD-N | 9.0 | 9.1 | 6.5 | 5.9 | 3.5 |
| RT-IZOD-un | 39.4 | 39.7 | 39.7 | 39.9 | 38.9 |
| —40-IZOD-N | 2.3 | 1.1 | 1.4 | 1.4 | 2.5 |
| —40-IZOD-un | 18.9 | 9.8 | 7.3 | 13.5 | 26.7 |
| Annealed HDT (°C.) | 89.5 | 91.5 | 91.0 | 90.5 | 87.0 |
| VICAT B | 97.5 | 100.5 | 99.5 | 100 | 99.5 |
| Spiral Flow (cm) | 23.5 | 20.5 | 20.2 | 19 | 15.5 |
| Low Shear Visc. | 10,612 | 13,994 | 12,901 | 17,115 | 20,809 |
| VHIT in. Lb./(J) | 8/0.9 | 10/1.12 | 40/4.5 | 42/4.7 | 84/9.48 |
| DTS (Min.) | 16 | 20 | 20 | 18 | 14 | at 264 psi, annealed 24 hours at 85° C.

As is shown in Table IV for Example Series 10-15, —40° C. notched and unnotched (UN) impact were improved in Examples 11-15 versus 10. Reference Examples C16 and C17 containing no PVC but higher levels of impact modifier generally exhibited no improvement compared with Examples 11-15. Comparative Examples C16 and C17 illustrate an unacceptable deficiency in DTS time which coincides with the higher levels of impact modifier. Spiral flow is reduced somewhat in Examples 11-15 versus 10 however C16 and C17 also illustrate loss of flow with higher impact modifier level.

Referring to Table IV and Example series 18-22, wherein the Δ I.V. is 1.14, the blend exhibits a different balance of properties than series 10-15. Series 18-22 exhibit somewhat higher HDT, and comparable impact properties except at the 10 and 20 part levels where room temperature impact is lower. Series 18-22 exhibit generally increased low shear viscosity and particularly at the 10 and 20 wt. part level. Spiral flow is seen to drop off significantly in Examples 21 and 22 corresponding to 10 and 20 parts of the 1.6 I.V. PVC respectively. Compared with Examples 14 and 15, Examples 21 and 22 exhibit a less desired combination of properties, however Examples 18-20 having lower amounts i.e., 1,3, and 5 wt. parts respectively of the 1.6 I.V. PVC exhibit a preferred combination of properties. Example series 18-22 represent a Δ I.V. outside the preferred range, however for a composition having a α I.V. between 1.0 and 1.5, satisfactory compositions are thus shown when the amount of PVC present does not exceed about 15 weight parts and preferably not exceeding 10 wt. parts per 100 weight parts of CPVC and PVC combined.

Generally, HDT, VICAT B, DTS time and variable height impact tests (VHIT) are improved while other properties are not appreciably sacrificed. Series 18-22 will exhibit improved weatherability compared to a compound containing higher levels of conventional impact modifier. The melt processibility of C16 and C17 would not be adequate due to low DTS time. DTS time is not generally sacrificed to a great extent in the preferred blends.

Various changes and modifications may be made in carrying out the present invention without departing from the spirit and scope thereof. Insofar as these changes are within the purview of the appended claims they are to be considered as part of the invention.

What is claimed:

1. A blend composition comprising a non-crosslinked chlorinated polyvinyl chloride (CPVC) polymer derived from a precursor polyvinyl chloride polymer (PVC) having an inherent viscosity measured similarly per ASTM-D1243 of from 0.2 to 2.0, in combination with from 3 to 30 weight parts per 100 weight parts of said blend of a polyvinyl chloride polymer blended therewith and having an inherent viscosity of from 0.4 to 2.5, and an impact modifier wherein said inherent viscosity for said polyvinyl chloride must be 0.2 to about 1.0 units higher than said inherent viscosity for said precursor polyvinyl chloride for said chlorinated polyvinyl chloride (ΔI.V.).

2. The composition of claim 1 wherein said inherent viscosity for said polyvinyl chloride is from about 0.2 to about 1.0 units higher than said inherent viscosity for the precursor PVC for said chlorinated polyvinyl chloride.

3. The composition of claim 2 wherein said inherent viscosity for said polyvinyl chloride is from about 0.3 to about 1.0 units higher than said inherent viscosity for the precursor PVC for said chlorinated polyvinyl chloride.

4. The composition of claim 3 wherein said inherent viscosity for said polyvinyl chloride is from about 0.35 to about 0.65 units higher than said inherent viscosity for the precursor PVC for said chlorinated polyvinyl chloride.

5. The composition of claim 1 wherein said chlorinated polyvinyl chloride contains from about 60 to 70 weight percent chlorine.

6. The composition of claim 1 wherein the inherent viscosity for said precursor PVC for said chlorinated polyvinyl chloride is from about 0.2 to 1.0.

7. The composition of claim 1 wherein said inherent viscosity for said polyvinyl chloride blended therewith is from 0.8 to 1.6.

8. The composition of claim 7 wherein said inherent viscosity for said polyvinyl chloride is from 0.9 to 1.05.

9. The composition of claim 1 wherein the Δ I.V. is from 1.0 to 2.0 units provided that the amount of PVC does not exceed about 15 weight parts based on the combined weight parts of chlorinated polyvinyl chloride and polyvinyl chloride.

10. The composition of claim 9 wherein the Δ I.V. is from 1.0 to 2.0 units provided that the amount of PVC does not exceed about 10 weight parts based on the combined weight parts of chlorinated polyvinyl chloride and polyvinyl chloride.

11. The composition of claim 1 further comprising at least component selected from the group consisting of lubricant(s), processing aid(s), pigment(s), filler(s), antioxidant(s), stabilizer(s), impact modifier(s), and colorant(s).

12. The composition of claim 1 wherein said polyvinyl chloride blended therewith is present at from 0.1 to about 70 weight parts based on the combined weight of chlorinated polyvinyl chloride and polyvinyl chloride.

13. The composition of claim 12 wherein said polyvinyl chloride is present at from 0.1 to about 30 weight parts based on the combined weight of chlorinated polyvinyl chloride and polyvinyl chloride.

14. The composition of claim 12 wherein said polyvinyl chloride is present at from 0.1 to about 10 weight parts based on the combined weight of chlorinated polyvinyl chloride and polyvinyl chloride.

15. The composition of claim 12 wherein said polyvinyl chloride is present at from 1 to about 5 weight parts based on the combined weight of chlorinated polyvinyl chloride and polyvinyl chloride.

16. The composition of claim 1 further comprising an impact modifier present at from 1 to 30 weight parts based on the combined weight of chlorinated polyvinyl chloride and polyvinyl chloride.

17. The composition of claim 16 further comprising a Tg enhancing additive selected from the group consisting of a styrene- α-methylstyreneacrylonitrile terpolymer, an imidized polymethylmethacrylate, an imide polymethylmethacrylate copolymer, a styrene, α-methylstyrene, acrylonitrile, N-cyclohexyl maleiimide tetrapolymer, and a styrene, α-methylstyrene acrylonitrile, N-phenyl maleiimide tetrapolymer.

18. The composition of claim 16 wherein said impact modifier is present at from 5 to 20 weight parts based on the combined weight of chlorinated polyvinyl chloride and polyvinyl chloride.

19. The composition of claim 17 wherein said chlorinated polyvinyl chloride is present at between 80 and 99 weight parts, said polyvinyl chloride is blended therewith and present at between 1 and 20 weight parts, said impact modifier is present at between 5 and 12 weight parts, and said Tg enhancing additive is present at from 20 to 400 weight parts per 100 weight parts of chlorinated polyvinyl chloride and polyvinyl chloride.

20. A composition of claim 19 wherein said Tg enhancing additive is present at from 20 to 300 said parts.

21. A composition of claim 1 in a fused state.

22. An article comprising from about 30 to 99 weight parts of a chlorinated polyvinyl chloride polymer derived from a precursor polyvinyl chloride polymer having a inherent viscosity measured similarly per ASTM-D1243 of from 0.2 to 2.0, from 1 to about 70 weight parts of a polyvinyl chloride polymer blended having an inherent viscosity of from 0.4 to 2.5, a stabilizer and an impact modifier, wherein said inherent viscosity for said polyvinyl chloride blended therewith must be at least 0.2 units higher than said inherent viscosity for said precursor polyvinyl chloride for said chlorinated polyvinyl chloride.

23. The article of claim 22 wherein said inherent viscosity for said polyvinyl chloride is from 0.2 to 1.0 units higher than said inherent viscosity for said precursor polyvinyl chloride for said polyvinyl chloride.

24. The article of claim 22 wherein said chlorinated polyvinyl chloride contains from 60 weight percent to 70 weight percent chlorine.

25. The article of claim 22 wherein said inherent viscosity for said polyvinyl chloride is from about 0.35 to about 0.65 units higher than said inherent viscosity for said precursor polyvinyl chloride for said chlorinated polyvinyl chloride.

26. The article of claim 22 wherein the Δ I.V. is from 1.0 to 2.0 units provided that the amount of PVC does not exceed about 15 weight parts based on the combined weight parts of chlorinated polyvinyl chloride and polyvinyl chloride.

27. The article of claim 26 wherein the Δ I.V. is from 1.0 to 2.0 units provided that the amount of PVC does not exceed about 10 weight parts based on the combined weight parts of chlorinated polyvinyl chloride and polyvinyl chloride 28. A process for obtaining an improved balance of properties from a CPVC composition including impact resistance, heat deflection temperature, tensile strength, melt flow and melt viscosity comprising: admixing non-crosslinked chlorinated polyvinyl chloride which is derived from a precursor polyvinyl chloride polymer (PVC) having an inherent viscosity measured similarly per ASTM-D1243 of from 0.2 to 2.0, a polyvinyl chloride polymer blended therewith which has an inherent viscosity of from 0.4 to 2.5, and an impact of modifier, wherein said inherent viscosity for said polyvinyl chloride blended therewith is 0.2 to about 1.0 units higher than said inherent viscosity for said precursor polyvinyl chloride for said chlorinated polyvinyl chloride.

29. The process of claim 28 wherein said inherent viscosity for said polyvinyl chloride blended therewith is from about 0.2 to 1.0 units higher than said inherent viscosity for said precursor PVC for said chlorinated polyvinyl chloride.

30. The process of claim 28 wherein said inherent viscosity for said polyvinyl chloride is from about 0.3 to about 1.0 higher than said inherent viscosity for said precursor PVC for said chlorinated polyvinyl chloride.

31. The process of claim 28 wherein said inherent viscosity for said polyvinyl chloride is from about 0.35 to about 0.65 units higher than said inherent viscosity for said precursor PVC for said chlorinated polyvinyl chloride.

32. The process of claim 28 wherein the Δ I.V. is from 1.0 to 2.0 provided that the amount of PVC does not exceed about 15 weight parts based on the combined weight parts of chlorinated polyvinyl chloride and polyvinyl chloride.

33. The process of claim 28 wherein the Δ I.V. is from 1.0 to 2.0 units provided that the amount of PVC does not exceed about 10 weight parts based on the combined weight parts of chlorinated polyvinyl chloride and polyvinyl chloride.

34. The process of claim 28 wherein said chlorinated polyvinyl chloride contains from about 60 to 70 weight percent chlorine.

35. The process of claim 28 wherein said inherent viscosity for said precursor PVC for said chlorinated polyvinyl chloride is from about 0.3 to 1.0.

36. The process of claim 28 wherein said inherent viscosity for said polyvinyl chloride is from 0.8 to 1.6.

37. The process of claim 36 wherein said inherent viscosity for said polyvinyl chloride is from 0.9 to 1.05.

* * * * *

UNITED STATES PATENT AND TRADEMARK OFFICE
CERTIFICATE OF CORRECTION

PATENT NO. : 5,274,043
DATED : December 28, 1993
INVENTOR(S) : William S. Greenlee et al.

It is certified that error appears in the above-indentified patent and that said Letters Patent is hereby corrected as shown below:

In column 14, claim 30, line 3, insert --units-- after the phrase "about 1.0".

In column 14, line 28, claim 28, after the phrase "and an impact", delete the word "of".

Signed and Sealed this

Seventh Day of June, 1994

Attest:

BRUCE LEHMAN

*Attesting Officer*     Commissioner of Patents and Trademarks